United States Patent
Liu et al.

(10) Patent No.: US 10,957,886 B2
(45) Date of Patent: Mar. 23, 2021

(54) BATTERY HAVING MULTILAYER PROTECTIVE CASING

(71) Applicant: FRONT EDGE TECHNOLOGY, INC., Baldwin Park, CA (US)

(72) Inventors: Kai Liu, Diamond Bar, CA (US); Jiuh-Ming Liang, Hacienda Heights, CA (US)

(73) Assignee: FRONT EDGE TECHNOLOGY, INC., Baldwin Park, CA (US)

( * ) Notice: Subject to any disclaimer, the term of this patent is extended or adjusted under 35 U.S.C. 154(b) by 96 days.

(21) Appl. No.: 15/921,559

(22) Filed: Mar. 14, 2018

(65) Prior Publication Data
US 2019/0288248 A1 Sep. 19, 2019

(51) Int. Cl.
*H01M 2/02* (2006.01)
*H01M 10/0562* (2010.01)
(Continued)

(52) U.S. Cl.
CPC ......... *H01M 2/0292* (2013.01); *H01M 2/026* (2013.01); *H01M 2/0207* (2013.01); *H01M 2/029* (2013.01); *H01M 2/0404* (2013.01); *H01M 10/0562* (2013.01); *H01M 10/0585* (2013.01); *H01M 2300/0068* (2013.01)

(58) Field of Classification Search
CPC .. H01M 2/0292; H01M 2/0207; H01M 2/026; H01M 2/029; H01M 2/0404; H01M 10/0562; H01M 10/0585; H01M 2300/0068; H01M 2/00
See application file for complete search history.

(56) References Cited

U.S. PATENT DOCUMENTS

| 4,119,769 A | 10/1978 | Schneider et al. |
| 4,233,371 A | 11/1980 | Dorrestijn |

(Continued)

FOREIGN PATENT DOCUMENTS

| EP | 1615287 A1 | 1/2006 |
| JP | 59-226472 A | 12/1984 |

(Continued)

OTHER PUBLICATIONS

BASF Elastollan Thermoset Polyurethane, Great Britain, Feb. 2005.
(Continued)

*Primary Examiner* — James Lee
(74) *Attorney, Agent, or Firm* — Ashok K. Janah; Janah & Associates, PC

(57) ABSTRACT

A battery comprises at least one battery cell on a support, the battery cell comprising (i) an electrolyte between a plurality of electrodes, and (ii) a top surface. A protective casing having a barrier layer contacts the top surface of the battery cell, the barrier layer comprising (i) an oxygen permeability or nitrogen permeability that is less than 80 $cm^3*mm/(m^2*day)$, (ii) a carbon dioxide permeability that is less than 1 $cm^3*mm/(m^2*day)$, and (iii) a water permeability that is less than 4 $g*mm/(m^2*day)$. A conformal coating covers the barrier layer, the conformal coating having a viscosity that is less than about 100,000 Pa-s at about 150° C. A cap is adhered to the conformal coating.

15 Claims, 1 Drawing Sheet

Figure 1:
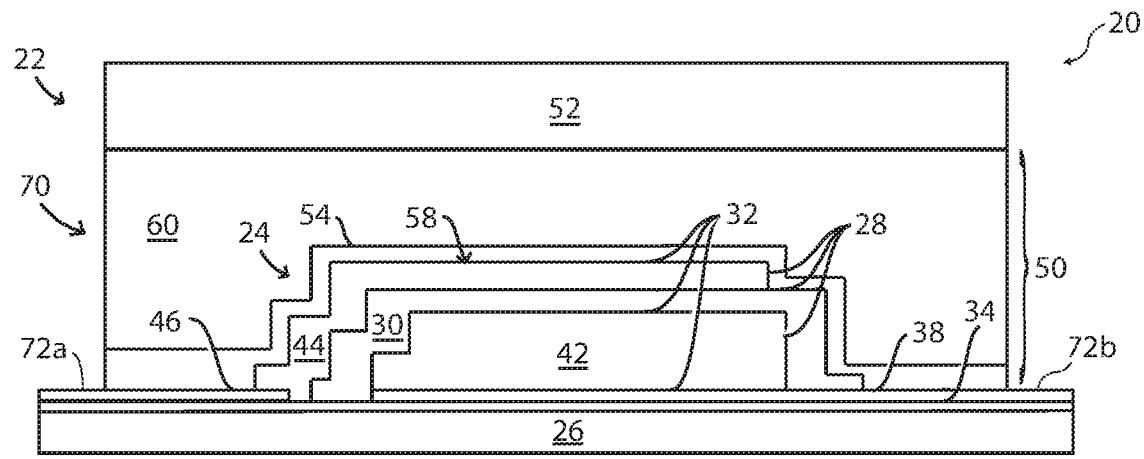

(51) Int. Cl.
*H01M 2/04* (2006.01)
*H01M 10/0585* (2010.01)

(56) References Cited

U.S. PATENT DOCUMENTS

| | | | |
|---|---|---|---|
| 4,421,835 | A | 12/1983 | Manassen et al. |
| 4,882,212 | A | 11/1989 | Singhdeo et al. |
| 5,197,889 | A | 3/1993 | Rizzo et al. |
| 5,254,415 | A | 10/1993 | Williams et al. |
| 5,498,490 | A | 3/1996 | Brodd |
| 5,554,456 | A | 9/1996 | Ovshinsky et al. |
| 5,561,004 | A | 10/1996 | Bates et al. |
| 5,607,789 | A | 3/1997 | Treger et al. |
| 5,629,560 | A | 5/1997 | Katsui et al. |
| 5,650,243 | A | 6/1997 | Ferment |
| 5,681,666 | A | 10/1997 | Treger et al. |
| 5,707,715 | A | 1/1998 | deRochemont et al. |
| 5,725,909 | A | 3/1998 | Shaw et al. |
| 5,932,368 | A | 8/1999 | Batawi et al. |
| 5,981,102 | A | 11/1999 | Grigg et al. |
| 6,039,850 | A | 3/2000 | Schulz |
| 6,051,114 | A | 4/2000 | Yao et al. |
| 6,146,715 | A | 11/2000 | Kim et al. |
| 6,168,884 | B1 | 1/2001 | Neudecker et al. |
| 6,218,049 | B1 | 4/2001 | Bates et al. |
| 6,220,765 | B1 | 4/2001 | Tatoh |
| 6,238,847 | B1 | 5/2001 | Axtell, III et al. |
| 6,365,010 | B1 | 4/2002 | Hollars |
| 6,413,645 | B1 | 7/2002 | Graff et al. |
| 6,461,757 | B1 | 10/2002 | Sasayama et al. |
| 6,517,968 | B2 | 2/2003 | Johnson et al. |
| 6,558,836 | B1 | 5/2003 | Whitacre et al. |
| 6,632,563 | B1 | 10/2003 | Krasnov et al. |
| 6,645,658 | B2 | 11/2003 | Morozumi |
| 6,680,145 | B2 | 1/2004 | Obrovac |
| 6,696,199 | B2 | 2/2004 | Yoshida |
| 6,713,987 | B2 | 3/2004 | Krasnov et al. |
| 6,780,544 | B2 | 8/2004 | Noh |
| 6,863,699 | B1 | 3/2005 | Krasnov et al. |
| 6,866,901 | B2 | 3/2005 | Burrows et al. |
| 6,916,679 | B2 | 7/2005 | Snyder et al. |
| 6,921,464 | B2 | 7/2005 | Krasnov et al. |
| 6,972,480 | B2 | 12/2005 | Zilber et al. |
| 6,982,132 | B1 | 1/2006 | Goldner et al. |
| 7,037,621 | B2 | 5/2006 | Kikuchi et al. |
| 7,056,620 | B2 | 6/2006 | Krasnov et al. |
| 7,122,908 | B2 | 10/2006 | Jiang et al. |
| 7,131,189 | B2 | 11/2006 | Jenson |
| 7,186,479 | B2 | 3/2007 | Krasnov et al. |
| 7,194,901 | B2 | 3/2007 | Silverbrook |
| 7,286,479 | B2 | 3/2007 | Bragg |
| 7,204,862 | B1 | 4/2007 | Zhang |
| 7,501,202 | B2 | 3/2009 | Enomoto et al. |
| 7,510,582 | B2 | 3/2009 | Krasnov et al. |
| 7,824,806 | B2 * | 11/2010 | Visco .................. H01B 1/122 429/231.9 |
| 7,846,579 | B2 | 12/2010 | Krasnov et al. |
| 7,862,627 | B2 | 1/2011 | Li et al. |
| 7,862,927 | B2 | 1/2011 | Krasnov et al. |
| 8,168,322 | B2 | 5/2012 | Krasnov et al. |
| 8,475,955 | B2 | 7/2013 | Krasnov et al. |
| 8,502,494 | B2 | 8/2013 | Nieh et al. |
| 8,628,645 | B2 | 1/2014 | Wang |
| 8,679,674 | B2 | 3/2014 | Liang et al. |
| 8,728,176 | B2 | 5/2014 | Li et al. |
| 8,753,724 | B2 | 6/2014 | Nieh et al. |
| 8,864,954 | B2 | 10/2014 | Liang et al. |
| 8,865,340 | B2 | 10/2014 | Liang et al. |
| 8,870,974 | B2 | 10/2014 | Nieh et al. |
| 9,077,000 | B2 | 7/2015 | Liang |
| 9,159,964 | B2 | 10/2015 | Shih et al. |
| 9,257,695 | B2 | 2/2016 | Liang |
| 9,356,320 | B2 | 5/2016 | Shih et al. |
| 9,887,429 | B2 | 2/2018 | Shih et al. |
| 9,905,895 | B2 | 2/2018 | Shih et al. |
| 2001/0007335 | A1 | 7/2001 | Tuttle et al. |
| 2001/0052645 | A1 | 12/2001 | Eynde et al. |
| 2002/0004167 | A1 | 1/2002 | Jenson |
| 2002/0041930 | A1 | 4/2002 | Erdemir et al. |
| 2002/0071989 | A1 | 6/2002 | Verma et al. |
| 2002/0100989 | A1 | 8/2002 | Jiang et al. |
| 2002/0102400 | A1 | 8/2002 | Gorokhovsky et al. |
| 2002/0110733 | A1 | 8/2002 | Johnson |
| 2002/0150823 | A1 | 10/2002 | Breitkopf et al. |
| 2003/0121142 | A1 | 7/2003 | Kikuchi et al. |
| 2003/0143460 | A1 | 7/2003 | Yoshida |
| 2003/0152829 | A1 | 8/2003 | Zhang |
| 2004/0086762 | A1 | 5/2004 | Maeda et al. |
| 2004/0175609 | A1 | 9/2004 | Yageta et al. |
| 2004/0234847 | A1 | 11/2004 | Mino et al. |
| 2005/0079418 | A1 | 4/2005 | Kelley et al. |
| 2005/0112461 | A1 | 5/2005 | Amine et al. |
| 2005/0147877 | A1 | 7/2005 | Tarnowski et al. |
| 2006/0027937 | A1 | 2/2006 | Igelman et al. |
| 2006/0040169 | A1 | 2/2006 | Liu et al. |
| 2006/0040170 | A1 | 2/2006 | Liu et al. |
| 2006/0060956 | A1 | 3/2006 | Tanikella |
| 2006/0068258 | A1 | 3/2006 | Kinoshita |
| 2006/0115706 | A1 | 6/2006 | Maeda et al. |
| 2006/0267546 | A1 | 11/2006 | Shen et al. |
| 2007/0000688 | A1 | 1/2007 | Mobley |
| 2007/0037054 | A1 | 2/2007 | Kikuchi et al. |
| 2007/0141460 | A1 | 6/2007 | You et al. |
| 2007/0172739 | A1 | 7/2007 | Visco |
| 2007/0200258 | A1 | 8/2007 | Mahler et al. |
| 2008/0003492 | A1 | 1/2008 | Bates |
| 2008/0217162 | A1 | 9/2008 | Delrue et al. |
| 2008/0263855 | A1 | 10/2008 | Li et al. |
| 2009/0010462 | A1 | 1/2009 | Ekchian et al. |
| 2009/0053601 | A1 | 2/2009 | Kelley |
| 2009/0136839 | A1 | 5/2009 | Krasnov et al. |
| 2009/0208671 | A1 | 8/2009 | Nieh et al. |
| 2010/0291431 | A1 | 11/2010 | Tung-Hsiu et al. |
| 2011/0076550 | A1 * | 3/2011 | Liang .................. H01M 2/0202 429/175 |
| 2012/0034502 | A1 | 2/2012 | Nieh et al. |
| 2014/0166471 | A1 | 6/2014 | Wang et al. |
| 2014/0291144 | A1 | 10/2014 | Nieh et al. |
| 2016/0248117 | A1 | 8/2016 | Liang |

FOREIGN PATENT DOCUMENTS

| | | |
|---|---|---|
| JP | 2002-313289 A | 10/2002 |
| JP | 2003-249199 A | 9/2003 |

OTHER PUBLICATIONS

PCT International Search Report in Application No. PCT-US2012-063100, dated Feb. 28, 2013.
PCT International Search Report in Application No. PCT-US2008-013213, dated Jun. 18, 2009.
PCT International Search Report in Application No. PCT-US2006-011204, dated Apr. 10, 2009.
Notice of Allowance in U.S. Appl. No. 11/090,408 dated Sep. 21, 2010.
Second Notice of Allowance in U.S. Appl. No. 11/090,408 dated May 12, 2010.
Advisory Action in U.S. Appl. No. 11/946,819 dated Dec. 6, 2010.
Final Office Action in U.S. Appl. No. 11/946,819 dated Sep. 13, 2011.
Final Office Action in U.S. Appl. No. 11/946,819 dated Sep. 27, 2010.
Office Action in U.S. Appl. No. 11/946,819 dated Mar. 11, 2010.
Office Action in U.S. Appl. No. 11/946,819 dated May 10, 2011.
Office Action in U.S. Appl. No. 11/946,819 dated Aug. 23, 2013.
Advisory Action in U.S. Appl. No. 12/454,255 dated Nov. 23, 2012.
Final Office Action in U.S. Appl. No. 12/454,255 dated Mar. 26, 2015.
Final Office Action in U.S. Appl. No. 12/454,255 dated Aug. 2, 2012.

(56) References Cited

OTHER PUBLICATIONS

Non-Final Office Action in U.S. Appl. No. 12/454,255 dated Aug. 23, 2014.
Non-Final Office Action in U.S. Appl. No. 12/454,255 dated Dec. 13, 2011.
Notice of Allowance in U.S. Appl. No. 12/783,520 dated Jan. 27, 2011.
Second Notice of Allowance in U.S. Appl. No. 12/783,520 dated Oct. 13, 2011.
Non-Final Office Action in U.S. Appl. No. 12/963,610 dated Oct. 6, 2011.
Final Office Action in U.S. Appl. No. 12/963,610 dated Apr. 25, 2012.
Non-Final Office Action in U.S. Appl. No. 12/963,610 dated Sep. 21, 2012.
Non-Final Office Action in U.S. Appl. No. 12/963,610 dated Mar. 26, 2013.
Notice of Allowance in U.S. Appl. No. 12/963,610 dated Jun. 18, 2013.
Advisory Action in U.S. Appl. No. 12/963,610 dated Jul. 26, 2012.
Notice of Allowance in U.S. Appl. No. 12/963,610 dated Feb. 14, 2014.
Advisory Action in U.S. Appl. No. 13/333,969 dated Dec. 16, 2014.
Final Office Action in U.S. Appl. No. 13/333,969 dated Aug. 11, 2014.
Non-Final Office Action in U.S. Appl. No. 13/333,969 dated Dec. 3, 2013.
Notice of Allowance in U.S. Appl. No. 13/461,753 dated Mar. 12, 2013.
Non-Final Office Action in U.S. Appl. No. 13/461,753 dated Aug. 20, 2012.

* cited by examiner

BATTERY HAVING MULTILAYER PROTECTIVE CASING

BACKGROUND

Embodiments of the present invention relate to solid-state, thin film batteries and their packaging.

Solid-state, thin film batteries are made of solids and generally absent liquid electrolytes. They are fabricated from superimposed layers of battery components which have thicknesses of less than 10 mm or even less than 1000 microns. Such batteries can include single or multiple battery cells connected in series or parallel. Each battery cell comprises battery components, such as for example, (i) electrodes such as for example, an anode, cathode, anode current collector and cathode current collector, (ii) an electrolyte between the electrodes, and (iii) terminals that extend out of the battery to power external loads. Solid-state batteries are advantageous as they generally provide higher energy densities and specific energy densities than liquid-containing batteries. The volumetric energy density of a battery is its energy capacity per unit volume and its specific energy is its energy capacity per unit weight. Solid-state batteries having high energy densities and high specific energies are used for example in portable electronics, medical devices, and space systems. Large scale solid-state batteries are also used to power electric cars or store electrical power for buildings and electrical grids.

Protective packaging is used to protect the battery components of solid-state batteries from direct exposure to the external environment. The battery components are sensitive to exposure to the ambient environment. For example, environmental elements such as oxygen, carbon dioxide, nitrogen, moisture and organic solvents can permeate into the battery cell to erode or oxidize battery components, such as lithium and lithium compounds, or even copper. Conventional protective packaging structures enclose battery cells with laminated layers of polymer and/or ceramic, an overlying cap and an underlying substrate, to protect the batteries.

However, conventional packaging structures often fail to adequately protect solid-state batteries as the batteries become ever smaller or have higher volumetric energy density and specific energy requirements. For example, as energy density requirements become higher, the volume of space allowed for protective packaging around the battery cells becomes ever smaller. As a result, conventional packaging structures of polymer are not sufficiently thickness to provide the desired impermeability to the environment. It has been found that tubular channels can also form in polymer packaging layers allowing environmental gases and vapor to penetrate the packaging layers and enter the battery. Poor adhesion of a cap to the underlying packaging structure can also result in exposure of battery cells to the external environment.

For reasons including these and other deficiencies, and despite the development of various packaging structures for solid-state batteries, further improvements in battery packaging and related methods of fabrication are continuously being sought.

SUMMARY

A battery comprises at least one battery cell on a support, the battery cell comprising (i) an electrolyte between a plurality of electrodes, and (ii) a top surface. A protective casing having a barrier layer contacts the top surface of the battery cell, the barrier layer comprising (i) an oxygen permeability or nitrogen permeability that is less than 80 $cm^3*mm/(m^2*day)$, (ii) a carbon dioxide permeability that is less than 1 $cm^3*mm/(m^2*day)$, and (iii) a water permeability that is less than 4 $g*mm/(m^2*day)$. A conformal coating covers the barrier layer, the conformal coating having a viscosity that is less than about 100,000 Pa-s at about 150° C. A cap is adhered to the conformal coating.

In another version, the conformal coating (i) has a viscosity that is less than about 100,000 Pa-s at about 150° C., and (ii) adheres to the cap, the barrier layer, or both, with a peel strength of at least about 30 N/m and a critical load that is greater than 10 N.

In still another version, the protective casing comprises a barrier layer, a conformal layer covering the barrier layer, the conformal layer having a viscosity that is less than about 100,000 Pa-s at about 150° C., an adhesion layer covering the conformal layer, the adhesion layer capable of adhering to a cap with peel strength greater than 30 N/m and a first critical load greater than 10 N, and a cap adhered to the adhesion layer.

DRAWINGS

Figure 2:
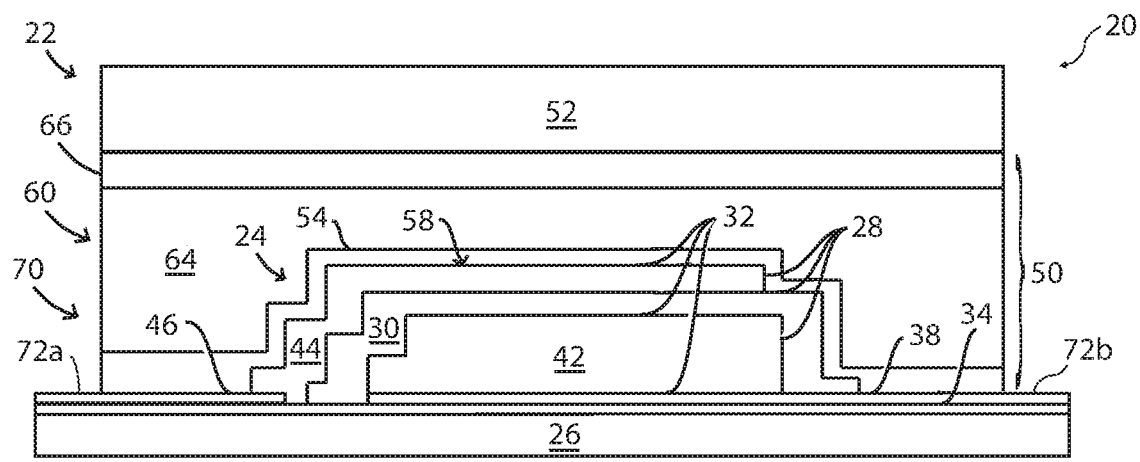

The features, aspects and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

FIG. 1 is a sectional side view of an exemplary battery comprising a protective casing enclosing a single battery cell on a support, the battery cell comprising a plurality of electrodes about an electrolyte, and the protective casing comprising a cap covering a conformal coating on a barrier layer; and FIG. 2 is a sectional side view of another exemplary battery showing a protective casing comprising a cap, a conformal coating comprising a conformal layer and a bonding layer, and a barrier layer.

DESCRIPTION

An embodiment of a battery 20 having features of the present invention comprises a protective casing 22 enclosing at least one battery cell 24 on a support 26, as illustrated in FIG. 1. The support 26 comprises a material that has low permeability to environmental elements such as oxygen, water vapor, carbon monoxide and carbon dioxide. The support 26 has a relatively smooth surface and sufficient strength to support layers of battery components 28 that operate to generate and store electrical energy. In a minimal configuration, a battery cell 24 comprises battery components 28 that include an electrolyte 30 between at least a pair of electrodes 32. The electrodes 32 collect electrons which are released from an electrolyte surface when ions travel through the electrolyte 30 and return electrons to another electrolyte surface. In one exemplary embodiment, the battery components 28 can include, for example, an adhesion layer 34 below electrodes 32 that include one or more of a cathode current collector 38, cathode 42, anode 44, and anode current collector 46. While an exemplary embodiment of a battery 20 and battery cell 24 is described herein, it should be understood that other battery structures and shapes, and batteries that include additional, fewer, or other battery components, as would be apparent to one of ordinary skill in the art, are included in the scope of the present invention.

The protective casing 22 protects the battery 20 from the external elements, allows the battery 20 to expand and contract during charge and discharge cycles, and adheres to one or more battery cells 24. The protective casing 22 comprises a multilayer structure 50 below a cap 52. The multilayer structure 50 includes a barrier layer 54 contacting the top surface 58 of a single battery cell 24 or multiple battery cells 24 to seal off the battery cells 24 from the external environment. The multilayer structure 50 also includes a conformal coating 60 adhered to, and formed over, the barrier layer 54 to smooth out the surface topology of the battery cells 24 and provide better sealing and adhesion of the overlying cap 52. The conformal coating 60 also allows the battery cell 24 to expand and contract as needed, and in one version, is adhered directly to the cap 52.

The barrier layer 54 serves as a barrier that limits the permeation of water vapor and gases to prevent these elements from reaching the battery cell 24. In one version, the barrier layer 54 is formed directly on, and in contact with, the top surface 58 of the battery cells 24, which may be may be the surface of an electrode 32 such as the anode 44 which is part of the battery cell 24. In one version, the barrier layer 54 is made from a polymer which has low gas and water vapor permeation. For example, the barrier layer 54 can have a water permeability rate that is sufficiently low to allow operation of the battery 20 at relative humidity levels higher than 90%. In one version, the barrier layer 54 has a water permeability rate of less than 4 g*mm/(m²*day).

The barrier layer 54 also minimizes the permeation of gaseous atmospheric elements, such as nitrogen, oxygen, and carbon dioxide, into the battery 20. Oxygen can cause oxidation of battery components 28 containing lithium to form lithium oxide which results in lower battery capacity and higher internal resistances or even catastrophic failure. Oxygen can also cause oxidation of battery components 28 of copper to form non-conductive copper oxide. Nitrogen can cause nitridation of lithium to form lithium nitride which can also result in decreased battery capacity and increased internal resistance. As another example, carbon dioxide reacts with lithium in lithium-containing material to form lithium carbide resulting in reduced battery capacity and higher internal resistances. Thus, in one version, the barrier layer 54 is selected to exhibit an oxygen and/or nitrogen permeability of less than 80 cm³*mm/(m²*day), or even less than 40 cm³*mm/(m²*day), or even less than 20 cm³*mm/(m²*day), such as 2 cm³*mm/(m²*day). Additionally the barrier layer 54 can also have a carbon dioxide permeability of less than 1 cm³*mm/(m²*day).

The barrier layer 54 also needs to be an electrically insulating polymer as it is in contact with an underlying electrode 32, such as the anode 44, anode current collector 46, cathode 42 or cathode current collector 38. In one version, the electrical resistance of the barrier layer 54 is sufficiently high that the leakage current through the barrier layer 54 at a battery voltage of about 4V is less than 10 nA, or even less than 1 nA. In one example, if the capacity of the battery 20 is 1 mAh and the required self-discharge of the battery is no more than 1% per year; then the current through the barrier layer 54 at about 4V should be less than about 1.1 nA. In another example, the resistance of the barrier layer 54 across the cathode 42 and anode 44 should be at least about 3600 MΩ.

The barrier layer 54 should also be non-reactive with each of the battery components 28 of the battery cell 24 and across the intended operating temperature range of the battery 20. For example, when the battery cells 24 include battery components 28 made of lithium, such as the anode 44, the barrier layer 54 should not react with lithium. Chemical reactions between the barrier layer 54 and lithium-containing battery components 28 can cause an increase in internal resistance, delamination, and higher interfacial stresses which can lead to poor charging and discharging cycle behaviors, or even catastrophic failure.

Suitable polymers for the barrier layer 54 include poly (vinylidene chloride) (PVDC), poly(isobutylene), or mixtures thereof. The thickness of the barrier layer 54 depends on its material and should be selected to provide sufficient protection from permeation by the elements while still allowing the energy density of the battery 20 to change by less than 10%. A suitable thickness is less than about 100 microns, or even from about 5 to about 75 microns, or even from about 20 to about 50 microns.

The conformal coating 60 covering the barrier layer 54 is conformal to the surface topography of the battery cells 24 to fill and smoothen out the convoluted surface topology of the battery cells 24. To do this, during fabrication, the conformal coating 60 has to flow into the crevices and gaps of the surface of the battery cells 24. The conformal coating 60 should also adhere well to both the overlying cap 52 and the underlying barrier layer 54 to reduce possible delamination of the cap 54 during fabrication steps at elevated temperatures or during battery operation. Still further, the conformal coating 60 should also have good elastic properties to allow the battery cell 22 to expand and contract during charging and discharging cycles. The conformal coating 60 can be composed of a single layer that has all the desired flow, adhesion and elastic properties, as shown in FIG. 1; or two or more layers that include a conformal layer 64 with the desired flow properties and a bonding layer 66 with the desired adhesion properties, as shown in FIG. 2.

The conformal coating 60 is adhered with heat and/or pressure to the surface topology of the battery cell 24. In one version, the conformal coating 60 is selected to have a viscosity of less than about 100,000 Pa-s at about 150° C., or even 30,000 Pa-s at about 150° C., to allow the conformal coating 60 to soften and conformably mold into and around the surface topography features of the battery cell 24 without the use of excessively high temperatures that would thermally degrade the battery cell 24. The viscosity can be measured using a Brookfield Thermocel Viscometer in Centipoises using a #27 Spindle at 10 rpm. Other viscosity measurement methods can include ASTM D7042, ASTM D455 or ASTM D7867, all of which are standard measuring methods for viscosity; however, it should be understood that the viscosity measurement values may vary from the numbers recited above when these different methods are used, and these values are included as equivalents in the scope of the present claims.

In addition to a low viscosity, the conformal coating 60 needs to adhere to the cap 52 with a sufficient strength to prevent delamination of the cap 52 during normal battery operating conditions. In one version, the conformal coating 60 has a peel strength of at least about 30 N/m and a critical load that is greater than 10 N. For essentially the same reasons, the conformal coating 60 also needs to adhere to the barrier layer 54 also with a sufficient strength to prevent delamination at that boundary during battery operation or fabrication. In one version, the conformal coating 60 adheres to the barrier layer 54 with a peel strength of at least about 30 N/m and a critical load greater than 10 N. The adhesion peel strength can be measured using ASTM D6862, ASTM D1876 or ASTM D3330/D3330M, all of which are standard measuring methods for adhesion.

The conformal coating 60 also has a sufficiently low elastic modulus to allow the underlying battery components 28 to expand during charging cycles and contract during discharging cycles. Lithium containing battery components 28, such as the electrolyte 30 and anode 44, expand and contract from the migration of charged species during operation of the battery 20. For example, in a battery cell 24 comprising an anode 44 composed of lithium, the thickness of the lithium anode 44 increases by 1 micron when battery 20 is fully charged to 4.2V for every 3 microns of thickness of a cathode 42 made of lithium cobalt oxide. The battery 20 needs to accommodate this volume change without generating excessive mechanical stresses that damage the battery cell 24. Because many of the battery components 28 have elastic modulus that are higher than 4.5 GPa (for example, lithium has an elastic modulus of 4.9 GPa), it was discovered that a conformal coating 60 having a lower elastic modulus of, for example, less than 2 GPa, can absorb the change in volume, especially when a number of battery cells 24 are stacked over one another. However, when the elastic modulus of the conformal coating 60 is too low, underlying battery components 28 (such as the anode 44) were found to develop a rough surface after several charge/discharge cycles causing a drop in excess capacity. It was determined that the conformal coating 60 should have an elastic modulus that is at least about 0.05 GPa at room temperature. Consequently, a suitable range of elastic modulus for the conformal coating 60 at room temperature is from about 0.05 GPa to about 2 GPa, or even from about 0.1 GPa to about 1 GPa. The elastic modulus was measured using ASTM C469 or ASTM C469M.

The thickness of the conformal coating 60 also affects the magnitude of the stress generated from the volume change of the battery components 28. Within the elastic limit of the conformal coating 60, the stress is approximately proportional to the amount of deformation (increase in thickness of the underlying battery component such as a lithium anode) divided by the original thickness of the conformal coating 60. Increasing the thickness of the conformal coating 60 can reduce the stress in the battery 20; however, any thickness increase would result in a corresponding reduction in energy density due to the increased volume of the battery. A higher thickness also increases the cross-sectional area of the side faces of the battery cells 22 resulting in increased permeation of external elements into the battery 20. So the thickness of the conformal coating 60 cannot be too high. A conformal coating 60 having the desired elastic modulus and thickness suppresses the roughening of lithium anode and reduces fading of the energy capacity of the battery 20 after multiple cycles without generating additional problems. In one example, for a battery 20 with a cathode 42 composed of $LiCoO_2$ having a thickness of less than 10 microns, a suitable thickness of the conformal coating 60 was determined to be from about 1 microns to about 20 microns.

A suitable conformal coating 60 comprises ethylene vinyl acetate (EVA). EVA is a copolymer of vinyl acetate and ethylene available as a free flowing powder. In one version, EVA includes 20 weight % ethylene and 80 weight % vinyl acetate. A suitable EVA has an elastic modulus of from about 0.10 to about 0.15 GPa, an adhesion peel strength of 13 piw, and a viscosity of 10500 cps at 121° C. Another conformal coating comprises poly(isobutylene) (FIB) which has an elastic modulus of about 0.05 GPa, a viscosity of about 25000 Pa-s at 150° C., and a peel strength of 3.75 piw to glass. Other suitable materials for the conformal coatings 60 include poly(methyl methacrylate), polysiloxane and rubber.

In another version, the conformal coating 60 is made from at least two layers that include, for example (i) a conformal layer 64 having the desired flow and elastic properties as described above, and (ii) a bonding layer 66 having the desired adhesive properties. In one version, the conformal layer 64 is the same as previously described polymer layers having a viscosity that is less than about 100,000 Pa-s at 150° C.—such as EVA or other materials. The bonding layer 66 is formed over the conformal layer 64 to adhere to the overlying cap 52. The bonding layer 66 is selected to be capable of adhering to the cap 52 with peel strength greater than 30 N/m and a critical load that is greater than 10 N. Strong adherence to the cap 52 is needed to allow the cap 52 to remain firmly bonded to the underlying multilayer structure 50. Suitable materials for the bonding layer 66 include polyisobutene, poly(methyl methacrylate), polysiloxane and rubber.

The protective casing 22 further includes the underlying support 26 and the overlying cap 52 which together enclose the multilayer structure 50 and battery cell 24. The support 26 and cap 52 are both made from a material that has low permeability to environmental elements and which also resists environmental degradation. The support 26 also typically has a relatively smooth processing surface upon which to form thin films, and sufficient mechanical strength to support the deposited thin films at fabrication and operating temperatures. The support 26 and cap 52 can be made from an insulator, semiconductor, or a conductor; depending upon the desired electrical properties of these structures. For example, the support 26 or cap 52 can be a plate of a ceramic or glass, such as for example, aluminum oxide, silicate glass and quartz; a metal such as aluminum or steel; or even a polymer.

In one version, the support 26, cap 52 or both, are made from a metal foil, polymer foil, metal foil coated with a polymer, or a metalized polymer film. In one version, a cap is made by bonding an electrically insulating polymer film to a metal foil. A suitable metal foil can be aluminum foil. A suitable electrically insulating polymer film can be parylene or epoxy. The metal foil allows the battery 20 to dissipate heat more effectively when the battery heats up during charging and discharging cycles. The battery 20 can also heat up when there is a localized electrical short caused by a defect in the electrolyte 30 or a sharp object penetrating the protective casing 22. The metal foil also dissipates heat more rapidly, by acting as a heat sink, to prevent an excessive rise in battery temperature. The polymer film electrically insulates the metal film from the battery circuit.

In another version, the support 26 and/or cap 52 are made from mica, a layered silicate typically having a muscovite structure with a the general stoichiometric formula of $KAl_3Si_3O_{10}(OH)_2$. Mica has a six-sided planar monoclinic crystalline structure that cleaves along the direction of the large planar surfaces. This allows the mica crystal to be split into thin foils along its basal lateral cleavage planes to provide thin, flat supports 26 having smooth surfaces. Mica is also chemically stable to common elements and inert to most acids, water, alkalis, and common solvents. Electrically, mica has a good dielectric strength, uniform dielectric constant across its surface, and low electrical power loss factor. Mica is also stable at high temperatures of up to 600° C. and has good tensile strength. A mica support 26 that is sufficiently strong to serve as a mechanical support for the battery 20, has a thickness of less than 100 microns, or even 50 microns, and more typically from about 10 to about 25 microns. In such thicknesses, mica serves as a barrier to external elements in the direction normal to the cleavage plane. Mica also has a relatively low weight and volume, which provides the desired specific energy and energy density of the battery 20. In one version, both the support 26 and cap 52 comprise mica sheets so that both the large area surfaces of the battery 20 are covered by mica. In another version, the support 26 and cap 52 are made from different materials; for example, a support 26 of mica and a cap 52 of metal foil or metal foil coated with a polymer.

In still other fabrication methods, a cap 54 comprising a multilayer structure is formed and then adhered to the top surface 58 of the battery cell 24 to form the structure shown in FIG. 1. In one method, a plate-like cap 52 is cleaned and a barrier layer 54 or conformal coating 60, or both, are adhered to the cap 52 to form the multilayer cap 52. In another method, a polymer film composed of a barrier layer 54 is coated with a liquid polymeric material that forms the conformal coating 60 to form a coated polymeric film. The coated polymeric film is adhered to a cap 52 to form a multilayer cap 52. In still another method, the cap 52 is coated with liquid polymeric materials to form a multilayer cap 52 having a plurality of polymer layers that include both the barrier layer 54 and the conformal coating 60 already adhered to the cap 52. In all of these methods, the multilayer cap 52 is then adhered to the top surface 58 of the battery cell 24 using heat and pressure to laminate the multilayer cap 52 to the battery cell 24.

The support 26 and facing cap 52 form a large portion of the external enclosing structure of the protective casing 22 that protects the internal battery cell 24 from exposure and corrosion by the surrounding environment. For example, in one type of battery, the external surface area of the support 26 and the external surface area of the cap 52 each measure at least about 30% (for a total of about 60%) of the total external surface area of the protective casing 22. The remaining less than 20%, or even less than 10%, of the external area of the protective casing 22 is formed by the side surfaces 70 between the cap 52 and support 26. By using the support 26 to serve as the supportive structure for the battery 20 as well as a portion of the protective casing 22, the weight and volume of the entire enclosing structure is minimized to thereby increase the energy density of the battery 20.

Suitable processes for fabricating the battery cells 24 and battery 20 are described in, for example, commonly assigned U.S. Pat. No. 6,632,563 filed on Sep. 7, 2000; U.S. Pat. No. 6,713,987 filed on Feb. 28, 2002; U.S. Pat. No. 6,863,699 filed on Nov. 3, 2000; U.S. Pat. Nos. 6,921,464; 7,056,620 filed on Mar. 22, 2001; U.S. Pat. No. 7,186,479 filed on Dec. 7, 2004; U.S. Pat. No. 7,510,582 filed on Mar. 31, 2009; U.S. Pat. No. 7,846,579 filed on Mar. 25, 2005; U.S. Pat. No. 7,862,627 filed on Apr. 27, 2007; U.S. Pat. No. 7,862,927 filed on Mar. 2, 2007; U.S. Pat. No. 8,168,322 filed on May 19, 2010; U.S. Pat. No. 8,475,955 filed on May 1, 2012; U.S. Pat. No. 8,502,494 filed on Aug. 27, 2010; U.S. Pat. No. 8,628,645 filed on Sep. 4, 2007; U.S. Pat. No. 8,679,674 filed on Dec. 8, 2010; U.S. Pat. No. 8,728,176 filed on Jan. 4, 2011; U.S. Pat. No. 8,753,724 filed on Sep. 26, 2012; U.S. Pat. No. 8,864,954 filed Dec. 23, 2011; U.S. Pat. No. 8,865,340 filed on Oct. 20, 2011; U.S. Pat. No. 8,870,974 filed on Feb. 18, 2008; U.S. patent application Ser. No. 11/946,819 filed on Nov. 28, 2007 now abandoned; U.S. patent application Ser. No. 12/454,255 filed on May 13, 2009 now abandoned; and U.S. patent application Ser. No. 13/333,969, filed on Dec. 21, 2011—all of which are commonly owned and incorporated herein by reference in their entireties.

In one exemplary process for fabricating a battery cell 24, the top and bottom surfaces of the support 26 are cleaned to remove surface contaminants to obtain good adherence of subsequently deposited battery component films. The support 26 can be cleaned by heating to temperatures sufficiently high to burn-off contaminants and impurities, such as organic materials, water, dust, and other materials, which are deposited on the support. The support 26 can also be heated to temperatures sufficiently high to remove water of crystallization present in the support material. The annealing temperatures and/or water of crystallization removal temperatures can be, for example, from about 150 to about 600° C., or even at least about 540° C. The annealing process can be conducted in an oxygen-containing gas, such as oxygen or air, or other gas environments, for about 10 to about 120 minutes, for example, about 60 minutes.

An adhesion layer 34 can be deposited on the surface of the support 26 to improve adhesion of overlying battery components 30. The adhesion layer 34 can comprise a metal or metal compound, such as for example, aluminum, cobalt, titanium, other metals, or their alloys or compounds thereof; or a ceramic oxide such as, for example, lithium cobalt oxide. When the adhesion layer 34 is fabricated from titanium, the titanium film is deposited in a sputtering chamber with, for example, the following process conditions: argon at a pressure of 2 mTorr; DC (direct current) sputtering plasma set at a power level of 1 kW, deposition time of 30 seconds, titanium target size of 5×20 inches, and target to support distance of 10 cm. To form batteries 20 on both sides of the support 26, a second adhesion layer (not shown) can be deposited on the bottom surface of the support 26, and a second battery cell (also not shown) built on this surface. The adhesion layer 34 is deposited to a thickness of from about 100 to about 1500 angstroms.

A cathode current collector 38 is formed on the adhesion layer 34 to collect the electrons during charge and discharge process. The cathode current collector 38 is typically a conductor and can be composed of a metal, such as aluminum, platinum, silver or gold. The current collector 38 may also comprise the same metal as the adhesion layer 34 provided in a thickness that is sufficiently high to provide the desired electrical conductivity. A suitable thickness for the current collector 38 is from about 0.05 microns to about 2 microns. In one version, the current collector 38 comprises platinum in a thickness of about 0.2 microns. DC magnetron sputtering conditions for depositing a platinum film from a platinum target can use a sputtering gas comprising argon at a gas pressure of 5 mTorr to form a DC plasma at a power level of 40 W for 10 minutes.

A cathode 42 comprising a lithium-containing material is formed over the current collector 38. In one version, the cathode 42 is composed of lithium metal oxide, such as for example, lithium cobalt oxide, lithium nickel oxide, lithium manganese oxide, lithium iron oxide, or even lithium oxides comprising mixtures of transition metals such as for example, lithium cobalt nickel oxide. Other types of cathodes 42 that may be used comprise amorphous vanadium pentoxide, crystalline $V_2O_5$ or $TiS_2$. The cathode can be deposited as a single film or as a stack of films, with alternate deposition and annealing steps. Typically, the cathode stack has a thickness of at least about 5 microns, or even at least about 10 microns. The cathode 42 can be annealed to reduce stress in the film at a temperature of from about 200 to about 500° C. The cathode 42 can also be annealed in a defect reducing step to temperatures from about 150 to about 700° C., for example, about 540° C., to further improve the a quality of the cathode 42 by reducing the amount of defects.

An electrolyte 30 also comprising a lithium-containing material is formed over the cathode 42. The electrolyte 30 can be, for example, an amorphous lithium phosphorus oxynitride film, also known as a LiPON film. In one embodiment, the LiPON has the stoichiometric form $Li_xPO_yN_Z$ in an x:y:z ratio of about 2.9:3.3:0.46. In one version, the electrolyte 30 has a thickness of from about 0.1 microns to about 5 microns. This thickness is suitably large to provide sufficiently high ionic conductivity and suitably small to reduce ionic pathways to minimize electrical resistance and reduce stress.

An anode 44 is formed on the electrolyte 30, and the anode 44 can be the same material as the cathode 42, as already described. A suitable thickness is from about 0.1 microns to about 20 microns. In one version, both the anode 44 and anode current collector 46 are made from lithium that is sufficiently conductive to serve as the anode current collector. In another version, the anode current collector 46 is deposited onto the electrolyte 30, and the anode 44 is deposited such that extends over the electrolyte 30 and onto a portion of the anode current collector 46. In this version, the anode current collector is the same material as the cathode current collector 38 to provide a conducting surface from which electrons may be dissipated or collected from the anode 44. The anode current collector 46 can also be made from a non-reactive metal such as silver, gold, platinum, in a thickness of from about 0.05 microns to about 5 microns. The anode current collector 46 can also be selectively deposited onto a region of the electrolyte 30. The anode 44 is then deposited onto the electrolyte 30 and part of the anode current collector 46.

The battery cell 24 comprising a plurality of battery component films 30, and/or the support 26, can be shaped to form shaped features, by for example, removing portions of the battery component films 30. The shaping processes can be performed before or after the battery component films 30 are deposited on the support 26. For example, after deposition of the cathode 42 and electrolyte 30, one or both of these layers can be shaped by etching away portions for each to form holes for terminals 72a,b which are used to electrically connect the battery 20 to an external electrical load. Suitable shaping processes include pulsed laser, etching, and other such processes. Shaping processes can be used to shape the battery component films 30 into features as shown in FIGS. 1 and 2.

After fabrication of one or more battery cells, the protective casing 22 is formed over the battery cells 24 to protect the battery cells 24 from the ambient or external environment. The protective casing 22 is sufficiently flexible to allow the battery components 28 of each battery cell 24 to expand and contract during operation of the battery 20. The protective casing 22 encloses and protects the battery cells 24 from exposure to, and degradation by, the external environment.

While exemplary versions of the battery 20, battery cell(s) 22 and protective casing 22 are described herein, it should be understood that other versions are possible as would be apparent to those of ordinary skill in the art, and all such versions are included within the scope of the present disclosure and claims. Thus the claims should not be limited in scope to the exemplary versions of the batteries 20, battery cells 24 and protective casing 22 described herein.

What is claimed is:

1. A battery comprising:
   (a) at least one solid-state battery cell on a support, the battery cell comprising (i) an electrolyte between a plurality of electrodes, and (ii) a top surface;
   (b) a barrier layer contacting the top surface of the battery cell, the barrier layer comprising poly(isobutylene) having (i) an oxygen permeability or nitrogen permeability that is less than 80 $cm^3*mm/(m^2*day)$, (ii) a carbon dioxide permeability that is less than 1 $cm^3*mm/(m^2*day)$, and (iii) a water permeability that is less than 4 $g*mm/(M^2*day)$;
   (c) a conformal coating covering the barrier layer, the conformal coating comprising ethylene vinyl acetate, and having a viscosity that is less than about 100,000 Pa-s at about 150° C., and
   (d) a cap adhered to the conformal coating.

2. A battery according to claim 1 wherein the barrier layer further comprises poly(vinyl chloride) or a mixture of poly(isobutylene) and poly(vinylidene chloride).

3. A battery according to claim 1 where the barrier layer comprises a thickness of less than 100 microns.

4. A battery according to claim 1 wherein the conformal coating comprises an elastic modulus of from about 0.05 GPa to about 2 GPa.

5. A battery according to claim 1 wherein the conformal coating comprises:
   (i) a conformal layer having a viscosity that is less than about 100,000 Pa-s at 150° C.; and
   (ii) a bonding layer covering the conformal layer, the bonding layer capable of adhering to the cap with peel strength greater than 30 N/m and a critical load that is greater than 10 N.

6. A battery according to claim 1 wherein the conformal coating comprises a layer of poly(isobutylene), poly(methyl methacrylate), polysiloxane or rubber.

7. A battery according to claim 1 wherein the cap comprises a plate of polymer, metal, ceramic or glass.

8. A battery according to claim 1 wherein the cap comprises mica, metal foil, polymer foil, metal foil coated with polymer, or metalized polymer film.

9. A battery comprising:
   (a) at least one solid-state battery cell on a support, the battery cell comprising (i) an electrolyte between a plurality of electrodes, and (ii) a top surface;
   (b) a barrier layer contacting the top surface of the battery cell, the barrier layer comprising poly(isobutylene) having (i) an oxygen permeability or nitrogen permeability that is less than 80 $cm^3*mm/(m^2*day)$, (ii) a carbon dioxide permeability that is less than 1 $cm^3*mm/(m^2*day)$, and (iii) a water permeability that is less than 4 $g*mm/(m^2*day)$;
   (c) a conformal coating covering the barrier layer, the conformal coating (i) comprising ethylene vinyl acetate having a viscosity that is less than about 100,000 Pa-s at about 150° C., and (ii) adhering to a cap, the barrier layer, or both, with a peel strength of at least about 30 N/m and a critical load that is greater than 10 N; and
   (d) the cap adhered to the conformal coating.

10. A battery according to claim 9 wherein the barrier layer further comprises poly(vinyl chloride) or a mixture of poly(isobutylene) and poly(vinylidene chloride).

11. A battery according to claim 9 wherein the conformal coating comprises an elastic modulus of from about 0.05 GPa to about 2 GPa.

12. A battery according to claim 10 wherein the conformal coating comprises a layer of poly(isobutylene), poly(methyl methacrylate), polysiloxane or rubber.

13. A battery according to claim 9 wherein the cap comprises a plate of polymer, metal, ceramic or glass.

14. A battery according to claim 9 wherein the cap comprises mica, metal foil, polymer foil, metal foil coated with polymer, or metalized polymer film.

15. A battery comprising:
(a) at least one solid-state battery cell on a support, the battery cell comprising (i) an electrolyte between a plurality of electrodes, and (ii) a top surface;
(b) a barrier layer contacting the top surface of the battery cell, the barrier layer comprising poly(isobutylene) having (i) an oxygen permeability or nitrogen permeability that is less than 80 $cm^3*mm*(m^2*day)$, (ii) a carbon dioxide permeability that is less than 1 $cm^3\text{-}mm/m^2\text{-}day$, and (iii) a water permeability that is less than 4 $g*mm/(m^2*day)$;
(c) a conformal layer covering the barrier layer, the conformal layer comprising ethylene vinyl acetate having a viscosity that is less than about 100,000 Pa-s at about 150° C.;
(d) a bonding layer covering the conformal layer, the bonding layer capable of adhering to a cap with peel strength greater than 30 N/m and a first critical load greater than 10 N; and
(e) a cap adhered to the bonding layer.

\* \* \* \* \*